US012687974B2

(12) United States Patent
Li et al.

(10) Patent No.: US 12,687,974 B2
(45) Date of Patent: Jul. 21, 2026

(54) SYSTEMS, METHODS, AND APPARATUS FOR CACHE CONFIGURATION BASED ON STORAGE PLACEMENT

(71) Applicant: Samsung Electronics Co., Ltd., Suwon-si (KR)

(72) Inventors: Zongwang Li, Dublin, CA (US); Tong Zhang, Mountain View, CA (US); Rekha Pitchumani, Oak Hill, VA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 84 days.

(21) Appl. No.: 18/418,066

(22) Filed: Jan. 19, 2024

(65) Prior Publication Data

US 2024/0402924 A1     Dec. 5, 2024

Related U.S. Application Data

(60) Provisional application No. 63/469,823, filed on May 30, 2023.

(51) Int. Cl.
*G06F 3/06* (2006.01)

(52) U.S. Cl.
CPC .......... *G06F 3/0631* (2013.01); *G06F 3/0622* (2013.01); *G06F 3/0679* (2013.01)

(58) Field of Classification Search
CPC .... G06F 3/0631; G06F 3/0622; G06F 3/0679; G06F 12/0864; G06F 12/128; G06F 2212/1024; G06F 12/127; G06F 2212/1044; G06F 12/0868; G06F 2212/261; G06F 2212/502; G06F 2212/7204; G06F 2212/7205; G06F 2212/7208; G06F 12/0873; G06F 2212/214; G06F 2212/313;
(Continued)

(56) References Cited

U.S. PATENT DOCUMENTS 6,314,503 B1 * 11/2001 D'Errico ................. G06F 3/061
                                                                              711/E12.019
6,349,363 B2   2/2002 Cai et al.
(Continued)

FOREIGN PATENT DOCUMENTS

AU        2002242026 A1    8/2002
EP           4120090 A1    1/2023

OTHER PUBLICATIONS

Extended European Search Report for Application No. 24176318.4, mailed Aug. 13, 2024.

*Primary Examiner* — Michael Krofcheck
(74) *Attorney, Agent, or Firm* — Renaissance IP Law Group LLP

(57)           ABSTRACT

A device may include a first memory media, a second memory media, and at least one control circuit configured to receive placement information for data, store, in a portion of the first memory media, based on the placement information, the data, and store, in a portion of the second memory media, based on the placement information, the data. The at least one control circuit may be configured to receive a request to access, from the portion of the first memory media, the data, and access, based on the request, from the portion of the second memory media, the data. The at least one control circuit may be configured to modify, based on an allocation status, the portion of the first memory media to an available state.

20 Claims, 9 Drawing Sheets

(58) Field of Classification Search
CPC ............. G06F 2212/601; G06F 3/0604; G06F
3/0629; G06F 3/0671; G06F 3/061; G06F
3/0658; G06F 12/0802
See application file for complete search history.

(56) References Cited

U.S. PATENT DOCUMENTS

| | | | |
|---|---|---|---|
| 6,460,122 B1 | 10/2002 | Otterness et al. | |
| 6,745,286 B2 | 6/2004 | Staub et al. | |
| 6,792,507 B2 | 9/2004 | Chiou et al. | |
| 7,990,994 B1 | 8/2011 | Yeh et al. | |
| 9,081,501 B2 | 7/2015 | Asaad et al. | |
| 9,971,643 B2 | 5/2018 | Gao et al. | |
| 10,255,190 B2 | 4/2019 | Loh | |
| 11,294,808 B2 | 4/2022 | Roberts et al. | |
| 11,294,810 B2 | 4/2022 | Walker et al. | |
| 2006/0190686 A1* | 8/2006 | Tsuboi | G06F 12/0891 |
| | | | 711/143 |
| 2011/0119442 A1* | 5/2011 | Haines | G06F 12/0246 |
| | | | 711/170 |
| 2014/0040533 A1* | 2/2014 | Huang | G06F 12/02 |
| | | | 711/E12.008 |
| 2017/0161193 A1 | 6/2017 | Ueda | |
| 2018/0373626 A1 | 12/2018 | Sun et al. | |
| 2019/0114106 A1 | 4/2019 | Elie et al. | |
| 2021/0318801 A1 | 10/2021 | Benisty et al. | |
| 2021/0365376 A1 | 11/2021 | Roberts et al. | |
| 2022/0019535 A1* | 1/2022 | Narsale | G06F 12/0862 |
| 2022/0350749 A1* | 11/2022 | Artieri | G06F 12/12 |
| 2023/0004491 A1* | 1/2023 | Aga | G06F 12/0238 |
| 2023/0019966 A1* | 1/2023 | Sabol | G06F 12/0253 |
| 2024/0220128 A1* | 7/2024 | Kalwitz | G06F 3/0616 |

* cited by examiner

Start — 1002

Store, in a portion of a first memory media, based on placement information, data. — 1004

Store, in a portion of a second memory media, based on the placement information, the data. — 1006

Receive a request to access, from the portion of the first memory media, the data. — 1008

Access, based on the request, from the portion of the second memory media, the data. — 1010

End — 1012

1

SYSTEMS, METHODS, AND APPARATUS FOR CACHE CONFIGURATION BASED ON STORAGE PLACEMENT

REFERENCE TO RELATED APPLICATION

This application claims priority to, and the benefit of, U.S. Provisional Patent Application Ser. No. 63/469,823, filed May 30, 2023, which is incorporated by reference.

TECHNICAL FIELD

This disclosure relates generally to caches and storage, and more specifically to systems, methods, and apparatus for cache configuration based on storage placement.

BACKGROUND

A storage device may include storage media configured to store data received at the storage device. A storage device may also include a cache to store a copy of data stored in the storage media. An application or other user may access the storage device using one or more communication interfaces, communication protocols, and/or the like.

The above information disclosed in this Background section is only for enhancement of understanding of the background of the inventive principles and therefore it may contain information that does not constitute prior art.

SUMMARY

A device may include a first memory media, a second memory media, and at least one control circuit configured to receive placement information for data, store, in a portion of the first memory media, based on the placement information, the data, and store, in a portion of the second memory media, based on the placement information, the data. The at least one control circuit may be configured to receive a request to access, from the portion of the first memory media, the data, and access, based on the request, from the portion of the second memory media, the data. The at least one control circuit may be configured to modify, based on an allocation status, the portion of the first memory media to an available state. The portion of the first memory media may be a first portion of the first memory media, the portion of the second memory media may be a first portion of the second memory media, the placement information may be first placement information, the data may be first data, and the at least one control circuit may be configured to receive second placement information for second data, store, in a second portion of the first memory media, based on the second placement information, the second data, and store, in a second portion of the second memory media, based on the second placement information, the second data. The at least one control circuit may be configured to receive configuration information, configure the first portion of the first memory media based on the configuration information, and configure the first portion of the second memory media based on the configuration information. The at least one control circuit may be configured to receive first configuration information, and configure the first portion of the second memory media based on the first configuration information. The at least one control circuit may be configured to receive second configuration information, and configure the second portion of the second memory media based on the second configuration information. The at least one control circuit may be configured to receive a request to perform an operation associated with the portion of the first memory media, and perform, based on the request, the operation using the portion of the second memory media. The operation may include copying, from the portion of the second memory media to the portion of the first memory media, at least a portion of the data. The operation may include modifying a status of at least a portion of the portion of the second memory media. The at least one control circuit may be configured to perform, based on a result of a first operation to access the portion of the second memory media, an access operation including performing a second operation to access the portion of the first memory media, and performing a third operation to access the portion of the second memory media. The result of the first operation to access the portion of the second memory media may include reading, from the portion of the second memory media, at least a portion of the data. The at least one control circuit may be further configured to perform the access operation based on a result of a fourth operation to access the portion of the second memory media. The result of the first operation to access the portion of the second memory media may include reading, from the portion of the second memory media, at least a portion of the data, and the result of the fourth operation to access the portion of the second memory media may include reading, from the portion of the first memory media, at least a portion of the data.

A device may include a first memory media, a second memory media, and at least one control circuit configured to receive first configuration information to configure, based on placement information for data, a portion of the first memory media, receive second configuration information to configure, based on the placement information for the data, a portion of the second memory media, receive a request to access, from the portion of the first memory media, the data, and access, based on the request, from the portion of the second memory media, the data. The placement information for the data may be first placement information for first data, the portion of the first memory media may be a first portion of the first memory media, the portion of the second memory media may be a first portion of the second memory media, and the at least one control circuit may be configured to receive third configuration information to configure, based on second placement information for second data, a second portion of the first memory media, and receive fourth configuration information to configure, based on the second placement information for the second data, a second portion of the second memory media. The at least one control circuit may be configured to modify, based on an allocation status, the portion of the first memory media to an available state.

A method may include storing, in a portion of a first memory media, based on placement information, data, storing, in a portion of a second memory media, based on the placement information, the data, receiving a request to access, from the portion of the first memory media, the data, and accessing, based on the request, from the portion of the second memory media, the data. The portion of the first memory media may be a first portion of the first memory media, the portion of the second memory media may be a first portion of the second memory media, the placement information may be first placement information, the data may be first data, the request may be a second request, and the method may further include storing, in a second portion of the first memory media, based on second placement information, second data, storing, in a second portion of the second memory media, based on the second placement information, the second data, receiving a second request to access, from the second portion of the first memory media, the second data, and accessing, based on the second request, from the second portion of the second memory media, the second data. The first portion of the second memory media may be operated based on first configuration information, and the second portion of the second memory media may be operated based on second configuration information.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
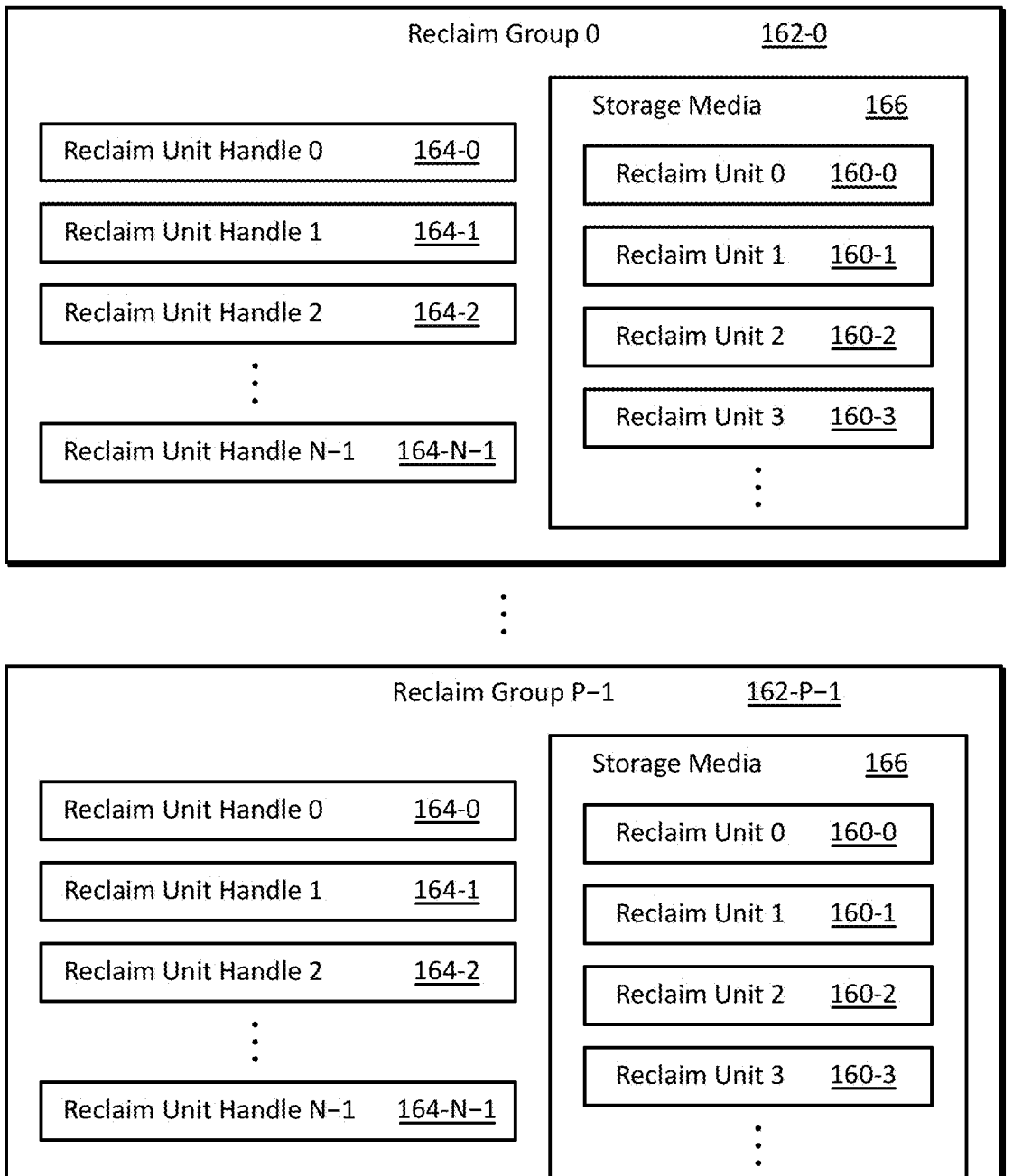
FIG. 1 illustrates an embodiment of a flexible data placement scheme for storage media in accordance with example embodiments of the disclosure.

A storage device may include a device cache that may reduce the latency of some access operations, for example, by storing a copy of frequently accessed data in cache media that may have a relatively low access latency compared to storage media. Thus, based on receiving a request to access data in storage media, the storage device may service the request by accessing the copy stored in the cache media. However, some workloads may have relatively low cache hit rates, and therefore, may not use cache media space effectively. For example, workloads that access data with little locality (e.g., relatively small amounts of data that may be scattered randomly in different locations) in applications such as database operations, artificial intelligence, machine learning, and/or the like, may have relatively low cache hit rates. Moreover, if multiple virtual machines (VMs) access the same storage device, the cache may be configured to use a cache strategy that may increase the hit rate for one VM but reduce the hit rate for other VMs. Thus, some portions of the device cache may operate in a wasteful manner.

In a cache scheme in accordance with example embodiments of the disclosure, placement information for data may be used to store the data in a portion of storage media and a corresponding portion of cache media. For example, a device may configure one or more portions (e.g., physical portions) of storage media as one or more placement units (which may also be referred to as data placement units). The device may also configure one or more portions of cache media to operate as one or more caches for one or more corresponding portions of storage media. For example, the device may store, in a portion of cache media, a copy of data that may be stored (previously, currently, and/or eventually, e.g., depending on a cache policy) in a corresponding portion of storage media.

In some embodiments, the device may receive data (e.g., from a user) and placement information for the data. The device may store the data in a portion of the storage media based on the placement information for the data. The device may also store the data (e.g., a copy of the data) in a portion of cache media that may be configured as a cache for the corresponding portion of the storage media. Thus, in some embodiments, the device may use placement information for data to store the data (and/or a copy of the data) in a portion of storage media and/or a corresponding portion of cache media.

In some embodiments, the device may receive a request to access the data that may be stored (e.g., previously, currently, and/or eventually) in a portion of the storage media that may be determined by placement information for the data. The device may access the requested data in the portion of storage media. Alternatively, or additionally, the device may access the requested data in the corresponding portion of cache media.

Examples of data placement units may include reclaim groups and/or reclaim units that may be used in a flexible data placement (FDP) scheme. An FDP scheme may store data for a user (e.g., an application) in a portion of physical storage media that may be implemented, for example, with one or more reclaim groups (and/or reclaim units) that may be erased as one or more units (e.g., one or more erase blocks). In some embodiments, storage media may be erased by modifying it to a state that may make it available for storing data. For example, storage media implemented with single-level cell (SLC) not-AND (NAND) flash memory may be erased by setting the state of the cells in an erase block to a logic one ("1"). Data may be stored in the erased cells by programming specific cells in the erased block to a logic zero ("0").

In an FDP scheme, one or more reclaim groups and/or reclaim units may be identified, for example, using one or more data placement directives, placement identifiers, reclaim group identifiers, placement handles, reclaim unit handles, reclaim unit handle identifiers, and/or the like. Thus, in an embodiment in which one or more data placement units may be implemented with one or more reclaim groups and/or reclaim units (e.g., in an FDP implementation), placement information for data to be stored in one or more data placement units may include one or more data placement directives, placement identifiers, reclaim group identifiers, placement handles, reclaim unit handles, reclaim unit handle identifiers, and/or the like.

In some embodiments, a second portion of device cache may be configured to cache data for a second portion of storage media that may be configured as a second placement unit, for example, as a second reclaim group. Thus, different cache strategies (e.g., configuration parameters such as cache sizes, placement policies, replacement policies, write policies, and/or the like) may be used for different portions of cache corresponding to different portions of storage media. Depending on the implementation details, this may improve one or more cache operational parameters such as hit rates, capacity utilization, latency, and/or the like, for one or more of the various portions of cache corresponding to various portions of storage media.

Additionally, or alternatively, some embodiments may implement one or more policies for cache flushing, bypass, and/or the like, based on a configuration of a portion of a device cache and a corresponding portion of storage media. For example, a device may invalidate data in one or more portions of a device cache corresponding to one or more portions of storage media, based, for example, on a request received from a user of the one or more portions of a device cache. Depending on the implementation details, such an embodiment may release cache space for use by other users, portions of storage media, and/or the like, thereby improving cache utilization and/or other performance parameters.

Additionally, or alternatively, some embodiments may implement one or more serial and/or parallel access mechanisms for one or more portions of cache and/or corresponding storage space that may be configured as a placement unit, for example, as a reclaim group using an FDP scheme. For instance, data with a relatively low likelihood of a cache hit may be accessed from a portion of cache in parallel with a corresponding portion of storage media, whereas data with a relatively high likelihood of a cache hit may be accessed from a portion of cache in sequence with a corresponding portion of storage media. Depending on the implementation details, such an embodiment may reduce latency, increase bandwidth, and/or improve other performance parameters.

This disclosure encompasses numerous principles relating to accessing data using a cache for storage media. The principles disclosed herein may have independent utility and may be embodied individually, and not every embodiment may utilize every principle. Moreover, the principles may also be embodied in various combinations, some of which may amplify some benefits of the individual principles in a synergistic manner.

For purposes of illustration, some example embodiments may be described in the context of some specific implementation details, however, the principles are not limited to these or any other implementation details. For example, some embodiments may be described in the context of storage devices that may use Compute Express Link (CXL) and/or Nonvolatile Express (NVMe) protocols, however, other embodiments may be implemented with other types of devices such as accelerators, memory expansion devices, memory buffers, and/or the like, using other types of protocols. As another example, some embodiments may be described in the context of storage media that may have portions based on an FDP scheme (e.g., based on reclaim groups and/or reclaim units), but other embodiments may exploit other types of data placement schemes in which data may be placed in one or more placement units based, for example, on a user of the data, a usage of the data, a type of the data, and/or the like. Thus, one or more schemes in accordance with example embodiments of the disclosure may exploit data placement information for its intended purpose, for other purposes, and/or to achieve the same or similar purposes in different manners.

FIG. 1 illustrates an embodiment of a flexible data placement scheme for storage media in accordance with example embodiments of the disclosure. The flexible data placement (FDP) scheme illustrated in FIG. 1 may enable a user such as a host, operating system, application, process, service, virtual machine (VM), VM manager, and/or the like, to arrange data into one or more physical reclaim units (RUs) 160-0, 160-1, . . . (which may be referred to collectively and/or individually as 160) and/or reclaim groups (RGs) 162-0, 162-1, . . . , 162-P−1 (which may be referred to collectively and/or individually as 162) in a storage device. A reclaim unit 160 may be implemented with a portion of physical storage media 166 (e.g., one or more erase blocks) that may be erased as a unit. A reclaim group may include one or more reclaim units. Depending on the implementation details, this may reduce write amplification, for example, by enabling the user to place data that is likely to be deallocated at the same time in the same reclaim group and/or reclaim unit.

A flexible data placement scheme may use a reclaim unit handle (RUH) 164-0, 164-1, 164-N−1 (which may be referred to collectively and/or individually as 164) to enable a user to specify one or more reclaim units 160 in the storage device into which the storage device may write data. For example, a user may send a write command to a storage device. The write command may specify data to be written to the storage device. The write command may also include, or provide a technique to indicate, a reclaim unit handle 164 to specify one or more reclaim units 160 into which the storage device may write the data. At the storage device, the reclaim unit handle 164 may initially reference a first reclaim unit 160 into which the storage device may write the data specified by the user.

The user may send one or more additional write commands specifying additional data to be written to the storage device using the same reclaim unit handle 164. The storage device may begin writing the additional data into the first reclaim unit 160 referenced by the reclaim unit handle 164. As the first reclaim unit becomes full, the storage device may modify the reclaim unit handle 164 to reference a second reclaim unit 160 into which the storage device may continue writing the data. Although no longer referenced by the reclaim unit handle 164 (a state that may be referred to as dereferenced or previously referenced), the first reclaim unit 160 may remain associated with the reclaim unit handle 164 to indicate that it was written using the reclaim unit handle 164.

Additionally, or alternatively, the FDP scheme illustrated in FIG. 1 may enable a user to send a write command that may indicate a reclaim group 162 into which the write data may be written. Additionally, or alternatively, the FDP scheme illustrated in FIG. 1 may use one or more parameters to implement an FDP scheme such as an FDP attribute (which may identify attributes of an FDP configuration), a default placement identifier list (PIDL), and/or the like.

Figure 2:
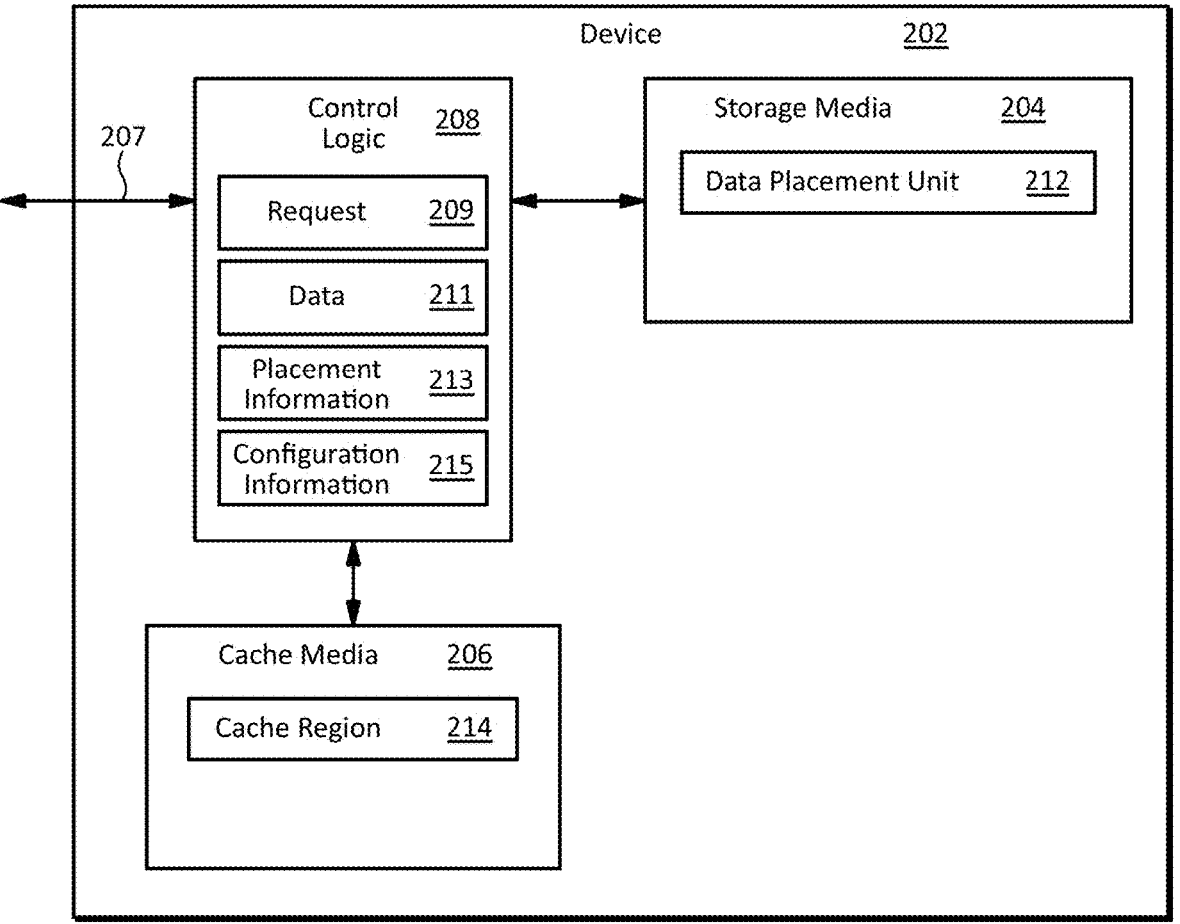
FIG. 2 illustrates an embodiment of a cache scheme for storage media in accordance with example embodiments of the disclosure.

FIG. 2 illustrates an embodiment of a cache scheme for storage media in accordance with example embodiments of the disclosure. The embodiment illustrated in FIG. 2 may be implemented with a device 202 that may include storage media 204, cache media 206, and/or control logic 208. The device 202 may communicate with a user through a communication connection 207 which may transfer access requests 209 (e.g., read and/or write requests, load and/or store requests, and/or the like), data 211, placement information 213, configuration information 215, addresses, metadata, and/or the like, to and/or from the device 202.

The storage media 204 may include at least one portion that may be configured and/or operated as a data placement unit 212. The data placement unit 212 may be implemented with a physical portion of the storage media 204 into which a data placement scheme may place data based, for example, on a user of the data (e.g., a host, operating system, application, process, service, VM, VM manager, and/or the like), a usage of the data (e.g., data, metadata, configuration data, error checking data, buffers, queues, logs, journals, and/or the like), a type of the data (e.g., integers, real numbers, characters, lists, tables, arrays, audio, video, and/or the like), and/or the like. The data placement unit 212 may be implemented, for example, with a physical portion of the storage media 204 such as a page, block, sector, row, erase block, track (e.g., shingled magnetic recording (SMR) track), reclaim group, reclaim unit, and/or the like.

The cache media 206 may include at least one portion that may be configured as a cache region 214 (which may also be referred to as a cache) for the data placement unit 212. The cache region 214 may be configured with one or more cache parameters such as cache size, cache level (e.g., in a hierarchical cache scheme), placement policy, replacement policy, write policy, and/or the like. Examples of cache placement policies that may be used may include direct mapping, N-way set associative (e.g., 2-way set associative, 4-way set associative, 8-way set associative, and/or the like), fully associative, and/or the like. Examples of cache replacement policies that may be used may include least recently used (LRU), least frequently used (LFU), random replacement, and/or the like, as well as replacement policies based on artificial intelligence (AI), machine learning (ML), and/or the like. Examples of write policies that may be used may include write-back, write-through, and/or the like.

The data placement unit 212 may be configured and/or operated based on configuration information, placement information 213, and/or the like. For example, a user may provide configuration information 215 to the control logic 208 that the control logic 208 may use to configure (e.g., allocate) a portion of the storage media 204 as a data placement unit 212. As another example, a user may provide (e.g., with an access request 209), placement information 213 that may request and/or instruct the control logic 208 to store data 211 associated with the access request 209 in the data placement unit 212. As a further example, a user may provide configuration information 215 to the control logic 208 that the control logic 208 may use to delete (e.g., deallocate) a data placement unit 212 (e.g., if the user may no longer use the data placement unit 212).

The cache region 214 may be configured and/or operated based at least in part on configuration information 215, placement information 213, and/or the like, received by the control logic 208. For example, a user may provide configuration information 215 to the control logic 208 that the control logic 208 may use to configure (e.g., allocate) a portion of the cache media 206 as a cache region 214. As another example, a user may provide configuration information 215 to the control logic 208 that the control logic 208 may use to associate the cache region 214 with the data placement unit 212. Thus, based on receiving a request 209 to access the data placement unit 212, the control logic 208 may check the cache region 214 for a cache hit or miss and access the cache region 214 and/or data placement unit 212 accordingly. As a further example, a user may provide configuration information 215 to the control logic 208 that the control logic 208 may use to configure the cache region

214 to implement one or more placement policies, replacement policies, write policies, and/or the like.

Additionally, or alternatively, the cache region 214 may be configured and/or operated based at least in part on one or more predetermined, learned, default, internal, and/or the like configurations, rules, policies, and/or the like. For example, the control logic 208 may implement one or more default cache configurations that may allocate a cache region 214 (e.g., with one or more predetermined placement, replacement, and/or write policies) for a data placement unit 212. In some embodiments, such a default cache configuration may be replaced based on receiving (e.g., from a user) configuration information 215 for the data placement unit 212. In some embodiments, such a default cache configuration may be replaced or modified based on learned information, for example, by monitoring accesses of the cache region 214 and/or data placement unit 212 to determine one or more access patterns. In some embodiments, one or more default cache configurations may be determined by a user.

Depending on the implementation details, the cache scheme illustrated in FIG. 2 may improve one or more cache operational parameters such as hit rates, capacity utilization, latency, and/or the like, release cache space for use by other users, portions of storage media, and/or the like, thereby improving cache utilization and/or other performance parameters, and/or improve one or more other performance parameters.

Any of the storage media disclosed herein, including the storage media 204 may be implemented with any type of nonvolatile memory media that may be used as storage media based, for example, on solid state media, magnetic media, optical media, and/or the like. For example, in some embodiments, storage media may be implemented with NAND flash memory, persistent memory such as cross-gridded nonvolatile memory, memory with bulk resistance change, phase change memory (PCM), and/or the like, or any combination thereof.

Any of the cache media disclosed herein, including the cache media 206, may be implemented with volatile memory media such as dynamic random access memory (DRAM), static random access memory (SRAM), and/or the like. Additionally, or alternatively, any of the cache media disclosed herein may be implemented with any type of nonvolatile memory media based on solid state media, magnetic media, optical media, and/or the like, as described above, or any combination thereof.

In some embodiments, the storage media 204 and cache media 206 may be implemented with media that may have one or more relative characteristics that may make one or both of them more suitable for their respective functions. For example, in some embodiments, the storage media 204 may be implemented with NAND flash memory which may have a relatively higher capacity, lower cost, and/or the like, whereas the cache media 206 may be implemented with DRAM which may have relatively lower access latency. As another example, in some embodiments, the storage media 204 may be implemented with magnetic media which may have a relatively higher capacity, lower cost, and/or the like, whereas the cache media 206 may be implemented with NAND flash which may have relatively lower access latency.

Any of the communication connections disclosed herein, including the communication connection 207, may be implemented with any interconnect and/or storage interface and/or protocol such as PCIe, NVMe, NVMe Key-Value (NVMe-KV), direct memory access (DMA), serial ATA (SATA), Small Computer System Interface (SCSI), serial attached SCSI (SAS), Compute Express Link (CXL) and/or a one or more CXL protocols such as CXL.mem, CXL-.cache, and/or CXL.io, Gen-Z, Coherent Accelerator Processor Interface (CAPI), Cache Coherent Interconnect for Accelerators (CCIX), and/or the like, or any combination thereof. Alternatively, or additionally, any of the communication connections disclosed herein, including the communication connection 207, may be implemented with any networking interface and/or protocol such as Ethernet, Transmission Control Protocol/Internet Protocol (TCP/IP), remote direct memory access (RDMA), RDMA over Converged Ethernet (RoCE), Fibre Channel, InfiniBand (IB), iWARP, NVMe-over-fabrics (NVMe-oF), and/or the like, or any combination thereof. Alternatively, or additionally, any of the communication connections disclosed herein, including the communication connection 207, may be implemented with any control and/or management interface including NVMe Management Interface (NVMe-MI), System Management Bus (SMBus), and/or the like.

Any of the devices disclosed herein, including the device 202, may be implemented in any form such as storage devices, accelerators, graphics processing units (GPUs), network interface cards and/or network interface controllers (NICs), and/or the like, having any physical form factor including one or more form factors used for storage devices (e.g., solid state drives (SSDs), hard disk drives (HDDs), and/or the like) and/or other devices such as Peripheral Component Interconnect Express (PCIe) add-in cards, 3.5 inch drives, 2.5 inch drives, 1.8 inch drives, M.2 drives. U.2 and/or U.3 drives, Enterprise and Data Center SSD Form Factor (EDSFF) drives, any of the SFF-TA-100X form factors (e.g., SFF-TA-1002), NF1, and/or the like, using any connector configuration such as PCIe, SATA, SCSI, SAS, M.2, U.2, U.3 and/or the like. In some embodiments, a device may be implemented in any other form, for example, as a collection of one or more components on a circuit board (e.g., integrated into a server motherboard, backplane, midplane, and/or the like).

Any of the devices disclosed herein, including the device 202, may be used in connection with one or more personal computers, smart phones, tablet computers, servers, server chassis, server racks, datarooms, datacenters, edge datacenters, mobile edge datacenters, and/or any combinations thereof.

Figure 3:
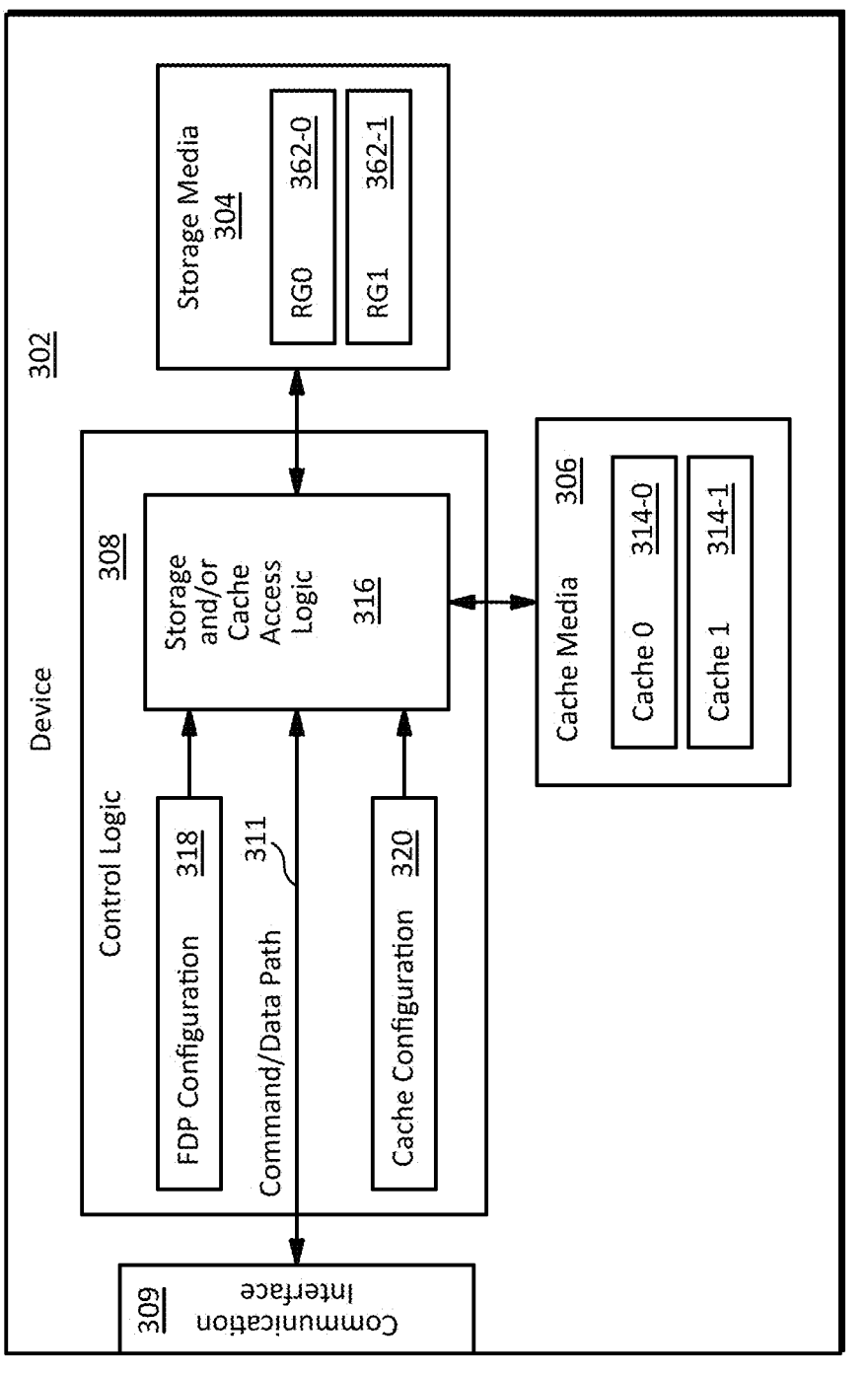
FIG. 3 illustrates an example embodiment of a cache scheme for storage media in accordance with example embodiments of the disclosure.

FIG. 3 illustrates an example embodiment of a cache scheme for storage media in accordance with example embodiments of the disclosure. The embodiment illustrated in FIG. 3 may be used, for example, to implement the embodiment illustrated in FIG. 2 in which similar elements may be indicated by reference numbers ending in, and/or containing, the same digits, letters, and/or the like.

Referring to FIG. 3, a device 302 may include storage media 304, cache media 306, and/or control logic 308. The device 302 may communicate through a communication connection using communication interface 309 which may implement any interconnect, storage, network, management, and/or the like, interface, protocol, and/or the like as described above. Requests and/or data for accessing the storage media 304 may be sent and/or received, for example, through a command and/or data (command/data) path 311.

The control logic 308 may include storage and/or cache access logic 316 (which may also be referred to as access logic) that may implement a cache scheme for the storage media 304. For example, the access logic 316 may configure and/or operate first and second portions of storage media 304 as data placement units 362-0 and 362-1 which, in this example, may be implemented with reclaim groups RG0 and RG1, respectively. The access logic 316 may configure and/or operate reclaim groups RG0 and/or RG1 based on FDP configuration information 318 which may be received, for example, from a user through the communication interface 309.

The access logic 316 may also configure and/or operate first and second portions of cache media 306 as cache regions 314-0 and 314-1 (which may also be referred to as caches, e.g., Cache 0 and Cache 1) for reclaim groups RG0 and RG1, respectively. The access logic 316 may configure and/or operate Cache 0 and/or Cache 1 based on cache configuration information 320 which may be received, for example, from a user through the communication interface 309. For example, in some embodiments, the cache configuration information 320 may specify a first configuration for Cache 0 including a cache size, placement policy, replacement policy, write policy, and/or the like, that the access logic 316 may use when processing requests to access the first reclaim group RG0. In such an embodiment, the cache configuration information 320 may also specify a second configuration for Cache 1 including a cache size, placement policy, replacement policy, write policy, and/or the like, that the access logic 316 may use when processing requests to access the second reclaim group RG1.

Additionally, or alternatively, the access logic 316 may configure and/or operate one or more of the caches 314-0 and/or 314-1 (which may also be referred to as cache regions) based at least in part on one or more predetermined, learned, default, internal, and/or the like configurations, rules, policies, and/or the like. Additionally, or alternatively, the access logic 316 may configure and/or operate one or more of the caches 314-0 and/or 314-1 based at least in part on at least some of the FDP configuration information 318. For example, in some embodiments, the access logic 316 may configure and/or operate one or more of the caches 314-0 and/or 314-1 based on a default configuration (e.g., in the absence of cache configuration information 320 for one or more of the caches 314-0 and/or 314-1).

Configuring and/or using multiple caches 314-0 and 314-1 for corresponding data placement units 362-0 and 362-1 may enable different cache configurations to be used for different data placement units. Depending on the implementation details, this may improve one or more cache operational parameters such as hit rates, capacity utilization, latency, and/or the like, for one or more of the caches 314-0 and/or 314-1.

One or more of the reclaim groups RG0 and/or RG1 may be implemented, as mentioned above, with one or more reclaim units. In some embodiments, a reclaim unit may be implemented (at least from the perspective of a user) as a logical representation of an underlying portion of physical storage media.

In some embodiments in which storage media may be implemented at least partially with flash memory, a reclaim unit may refer to one or more erase blocks, nonvolatile memory (NVM) devices (e.g., NVM dies) and/or the like, or any combination thereof, and a reclaim group may refer to one or more reclaim units, one or more NVM device partitions (e.g., planes), one or more NVM devices (e.g . . . . NVM dies), one or more storage devices (e.g., storage drives), and/or the like, or any combination thereof.

In some embodiments in which storage media may be implemented at least partially with magnetic media (e.g., shingled magnetic recording (SMR) media), a reclaim unit may refer to one or more shingle sections, zones, sectors, tracks, and/or the like, or any combination thereof, and a reclaim group may refer to one or more disks (e.g., drives), platters, tracks, zones, sectors, shingle sections, and/or the like, or any combination thereof.

In some embodiments in which storage media may be implemented at least partially with storage class memory (e.g., magnetoresistive random-access memory (MRAM), resistive random-access memory (ReRAM), phase change memory (PCM), cross-gridded nonvolatile memory, memory with bulk resistance change, and/or the like), a reclaim unit may refer to one or more banks, programming groups, and/or the like, or any combination thereof, and a reclaim group may refer to one or more die, banks, programming groups, and/or the like, or any combination thereof.

Figure 4:
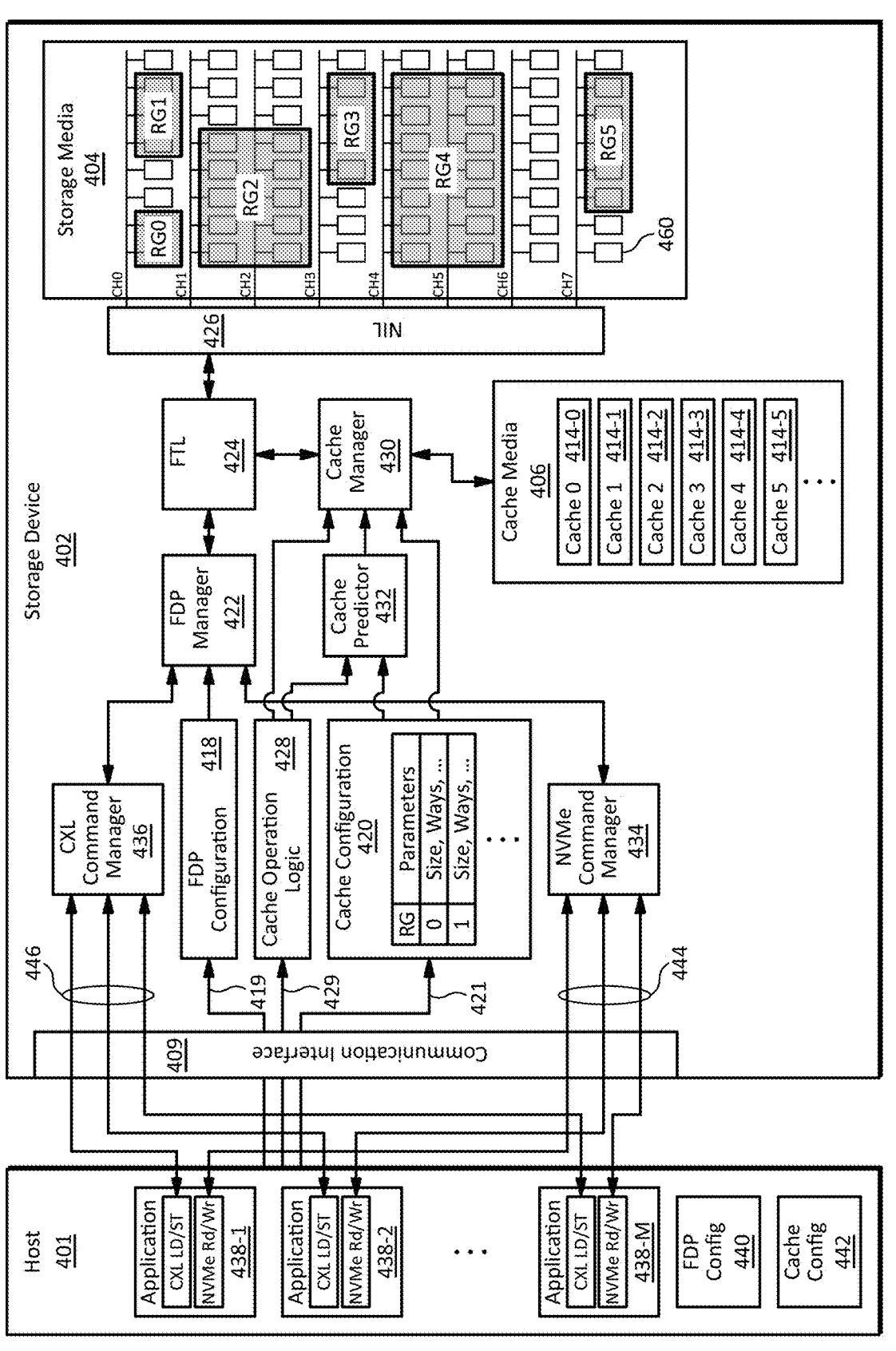
FIG. 4 illustrates another example embodiment of a cache scheme for storage media in accordance with example embodiments of the disclosure.

FIG. 4 illustrates another example embodiment of a cache scheme for storage media in accordance with example embodiments of the disclosure. The embodiment illustrated in FIG. 4 may be used, for example, to implement either of the embodiments illustrated in FIG. 2 and/or FIG. 3 in which similar elements may be indicated by reference numbers ending in, and/or containing, the same digits, letters, and/or the like.

Referring to FIG. 4, a storage device 402 may include storage media 404, a cache media 406, a communication interface 409, and/or control logic that may include one or more of the following elements: FDP configuration information 418, cache configuration information 420, an FDP manager 422, a flash translation layer (FTL) 424, a NAND interface layer (NIL) 426, cache operation logic 428, a cache manager 430, a cache predictor 432, a first (e.g., NVMe) command manager 434, and/or a second (e.g., CXL) command manager 436.

The storage media 404 may be implemented in this example with NAND flash that may be arranged in channels CH0, CH1, . . . . CHN that may be controlled by control logic (e.g., one or more NAND channel controllers) in the NAND interface layer 426. The flash translation layer 424 may implement one or more mapping schemes to map logical block addresses (LBAs) to physical block addresses (PBAs) in the storage media 404.

The FDP manager 422 may configure and/or operate one or more portions of the storage media 404 as data placement units which, in this example, may be implemented with reclaim groups based on the FDP configuration information 418. In this example, the FDP configuration information 418 may specify reclaim groups RG0, RG1, . . . . RG5, each of which may include a specified number of reclaim units 460 as illustrated in FIG. 4.

The cache media 406 in this example may be implemented with DRAM. In some embodiments, the cache manager 430 may use the cache configuration information 420 to configure and/or operate one or more portions of the cache media 406 as caches 414-0, 414-1, . . . (which may be referred to collectively and/or individually as 414, and which may also be referred to as cache regions) for one or more corresponding reclaim groups RG0, RG1, . . . . RG5, respectively. In this example, the cache configuration information 420 may specify caches Cache 0, Cache 1, . . . , Cache 5 corresponding to reclaim groups RG0, RG1, . . . , RG5, respectively.

Additionally, or alternatively, the cache manager 430 may configure and/or operate one or more caches 414 based at least in part on one or more predetermined, learned, default, internal, and/or the like configurations, rules, policies, and/or the like. Additionally, or alternatively, the cache manager 430 may configure and/or operate one or more of the caches 414 based at least in part on at least some of the FDP configuration information 418. For example, in some embodiments, the cache manager 430 may configure and/or operate one or more of the caches 414 based on a default configuration (e.g., in the absence of cache configuration information 420 for one or more of the caches 414).

The scheme illustrated in FIG. 4 may also include a host 401 on which one or more applications 438-1, 438-2, . . . , 438-M (which may be referred to collectively and/or individually as 438) may run. The host 401 may include user-side FDP configuration logic 440 that may be used by a user (e.g., one or more of the applications 438 and/or an operating system, process, service, VM, VM manager, and/or the like) to generate and/or send at least a portion of the FDP configuration information 418 to the storage device 402. The user-side FDP configuration logic 440 may be located (e.g., distributed) at least partially at one or more of the applications 438 and/or an operating system, process, service, VM, VM manager, and/or the like.

The host 401 may include and/or user-side cache configuration logic 442 that may be used by a user (e.g., one or more of the applications 438 and/or an operating system, process, service, VM, VM manager, and/or the like) to generate and/or send at least a portion of the cache configuration information 420 to the storage device 402. The user-side cache configuration logic 442 may be located (e.g., distributed) at least partially at one or more of the applications 438 and/or an operating system, process, service, VM. VM manager, and/or the like. In some embodiments, the user-side cache configuration logic 442 may enable a user to adjust a cache size, locality, and/or the like, for example, based on a size, locality, and/or the like of an associated data placement unit.

In some embodiments, the FDP configuration information 418 and/or cache configuration information 420 may be sent to the storage device 402 as shown by arrows 419 and/or 421, respectively, using one or more interfaces, protocols, and/or the like, that may support configuration and/or management operations such as NVMe-MI, CXL.io, and/or the like.

The cache configuration information 420 may be stored, for example, using a data structure such as a table, linked list, key-value store, and/or the like, having pairs of entries to identify one or more reclaim groups RG and corresponding cache configuration parameters as illustrated in FIG. 4. For example, the configuration information 420 illustrated in FIG. 4 may include an identifier, index, and/or the like, for one or more (e.g., each) of the reclaim groups RG0, RG1, . . . and corresponding parameters such as a placement policy (e.g., a number of ways and/or sets for an N-way set associative cache), a replacement policy, a write policy, a cache size, one or more base addresses for the cache 414-0 in the cache media 406, and/or the like. Thus, the cache configuration information 420 may include different cache configuration parameters for different reclaim groups, and thus, may implement different cache strategies for different reclaim groups.

The cache predictor 432 may provide one or more indications, estimates, predictions, and/or the like to enable the cache manager 430 to implement one or more cache configurations, operations, policies, strategies, and/or the like, based on one or more commands, requests, and/or the like received from the cache operation logic 428, cache configuration information 420, observations of accesses of the storage media 404 and/or cache media 406, and/or the like. For example, the cache predictor 432 may determine a likelihood of a cache hit, a cache eviction, and/or the like, to enable the cache manager 430 to implement a replacement policy for one or more caches 414. As another example, the cache predictor 432 may determine a likelihood of a cache hit to enable the cache manager 430 to implement a serial and/or parallel data access operation for one or more caches 414.

The cache operation logic 428 may implement one or more cache operations such as a flush operation, a bypass operation, an access operation, and/or the like for one or more caches 414. One or more of the cache operations may be based, for example, on one or more commands that may be received by the cache operation logic 428 as shown by arrow 429 using one or more interfaces, protocols, and/or the like, that may support configuration and/or management operations such as NVMe-MI, CXL.io, and/or the like.

The first command manager 434 may process commands to access the storage media 404, data to be stored in the storage media 404, data retrieved from the storage media 404, and/or the like. In this example, the first command manager 434 may implement an NVMe protocol that may enable a user (e.g., an application 438) to access the storage media 404 as storage using read and/or write (read/write) commands that may specify read and/or write addresses with one or more LBAs. The read/write commands, write data, read data, and/or the like may be sent and/or received using one or more connections 444 using an NVMe protocol. In some embodiments, the NVMe protocol may be implemented with an underlying CXL.io transport scheme.

In some embodiments, an access (e.g., read/write) request received by the first command manager 434 (e.g., from an application 438) may include placement information (e.g., a reclaim unit handle (RUH) and/or other placement information that may identify a reclaim group) to enable the FDP manager 422 to service the access request using a specific data placement unit (e.g., reclaim unit, reclaim group, and/or the like) specified in the FDP configuration information 418.

The FDP manager 422 may route an access request received by the first command manager 434 to the FTL 424 which may check the cache manager 430 to determine if a cache 414 (e.g., Cache 1) is associated with a reclaim group (e.g., RG1) associated with the access request, and if so, to check for a cache hit. The cache manager 430 and/or FDP manager 422 may handle a cache hit, cache miss, and/or the like based on one or more cache parameters associated with the reclaim group (e.g., RG1) in the cache configuration information 420. For example, in case of a cache miss for a read command, the cache manager 430 and/or FDP manager 422 may read the requested data from the corresponding reclaim group (e.g., RG1) in the storage media 404, evict one or more cache lines from the corresponding cache 414 (e.g., Cache 1) based on a replacement policy specified for RG1 in the cache configuration information 420, and send the requested read data to the first command manager 434 which may send the requested read data to a user that sent the read request (e.g., an application 438). In some embodiments, the cache predictor 432 may update one or more data structures with information about the read access operation to learn one or more access patterns for use, for example, for subsequent predictions.

Some embodiments may include a second command manager 436 that may process commands to access the storage media 404, data to be stored in the storage media 404, retrieved from the storage media 404, and/or the like. In this example, the second command manager 436 may implement CXL protocol that may enable a user (e.g., an application 438) to access the storage media 404 as memory using load and/or store (load/store) commands that may specify the requested data location as a memory address (e.g., a memory address that may be mapped to a hostmanaged device memory (HDM) region in system memory. The load/store commands, load data, store data, and/or the like may be sent and/or received using one or more connections 446 using, for example, a CXL.mem protocol.

Thus, the embodiment illustrated in FIG. 4 may implement a dual-mode (e.g., dual access method) scheme in which a user (e.g., an application 438) may access a data placement unit (e.g . . . a reclaim group) as memory using CXL load/store commands and/or as storage using NVMe read/write commands as shown in FIG. 4.

In some embodiments, the second command manager 436 may implement a memory-to-storage address translator (e.g., a CXL-to-LBA or CXL2LBA translator) to convert a memory address included with a load/store command to an LBA that the FDP manager 422 and/or FTL 424 may use to access the requested data in the storage media 404 in a manner similar to that described above with respect to access requests received by the first command manager 434.

In some embodiments, any or all of the FDP configuration information 418, cache configuration information 420, FDP manager 422, FTL 424, NAND interface layer 426, cache operation logic 428, cache manager 430, cache predictor 432, first command manager 434, and/or second command manager 436 may implement, and/or may be referred to collectively and/or individually as, control logic. In some embodiments, any or all of the FDP manager 422. FTL 424, NAND interface layer 426, cache operation logic 428, cache manager 430, cache predictor 432, first command manager 434, and/or second command manager 436 may implement, and/or may be referred to collectively and/or individually as, storage and/or cache access logic (e.g., similar to the storage and/or cache access logic 316 illustrated in FIG. 3). In some embodiments, the storage device 402 illustrated in FIG. 4 may implement a configurable (and/or reconfigurable) cache architecture based on a data placement scheme (e.g., an FDP scheme). In some embodiments, any or all of the FDP configuration information 418, cache configuration information 420, FDP manager 422, cache operation logic 428, cache manager 430, cache predictor 432, first command manager 434, and/or second command manager 436 may implement, and/or may be referred to collectively and/or individually as, a host interface layer (HIL).

Figure 5:
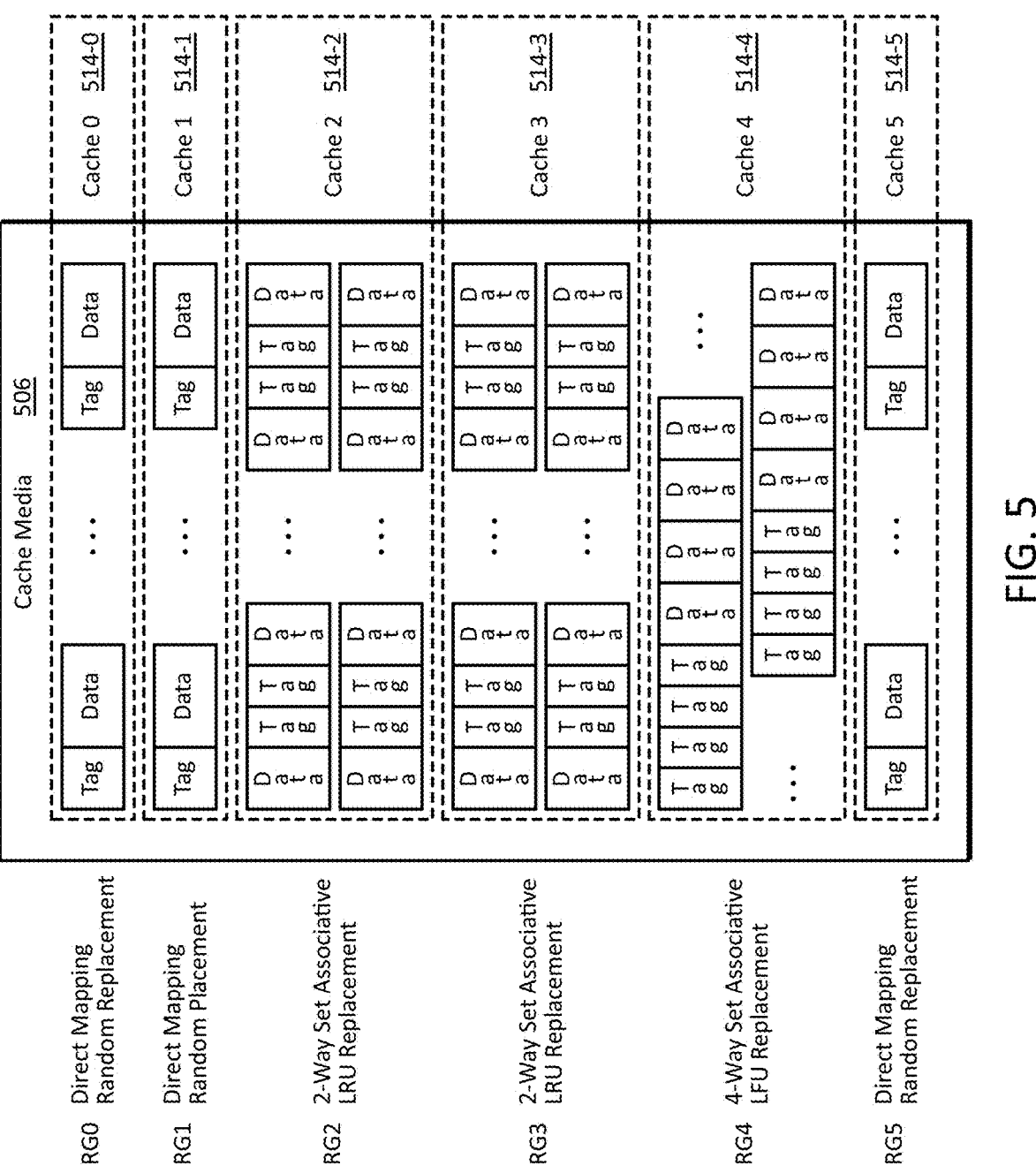
FIG. 5 illustrates an example embodiment of cache media in accordance with example embodiments of the disclosure.

FIG. 5 illustrates an example embodiment of cache media in accordance with example embodiments of the disclosure. The cache media 506 illustrated in FIG. 5 may be used, for example, to implement the cache media 406 illustrated in FIG. 4 in which similar elements may be indicated by reference numbers ending in, and/or containing, the same digits, letters, and/or the like.

Referring to FIG. 5, the cache media 506 may include one or more portions configured as caches 514-0, 514-1, . . . , 514-5 (which may also be referred to as cache regions indicated as Cache 0, Cache 1, . . . , Cache 5) for one or more corresponding data placement units (e.g., reclaim groups RG0, RG1, . . . . RG5, illustrated in FIG. 4, respectively) based, for example, on cache configuration information such as cache configuration information 420 illustrated in FIG. 4. Although cache media in accordance with example embodiments of the disclosure are not limited to any specific configuration, for purposes of illustrating the principles of the disclosure, in the example illustrated in FIG. 5, Cache 0 may be configured as a cache for RG0 with a direct mapping placement policy and/or a random replacement policy; Cache 1 may be configured as a cache for RG1 with a direct mapping placement policy and/or a random replacement policy; Cache 2 may be configured as a cache for RG2 with a 2-way set associative placement policy and/or a least recently used replacement policy; Cache 3 may be configured as a cache for RG3 with a 2-way set associative placement policy and/or a least recently used replacement policy; Cache 4 may be configured as a cache for RG4 with a 4-way set associative placement policy and/or a least frequently used replacement policy; and/or Cache 5 may be configured as a cache for RG5 with direct mapping placement policy and/or a random replacement policy.

Figure 6:
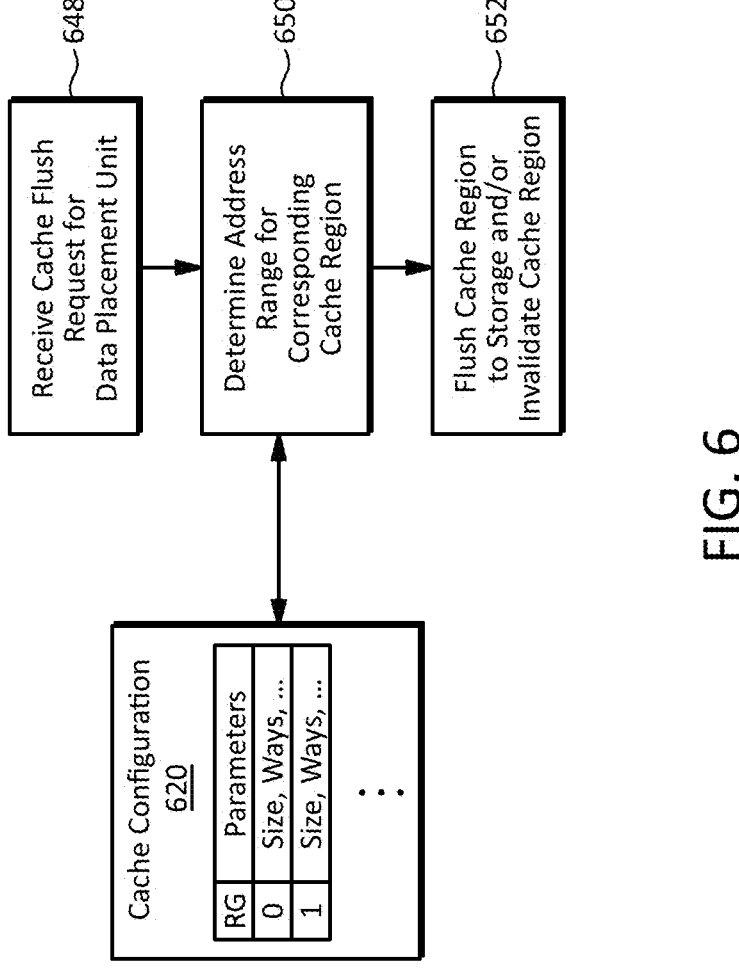
FIG. 6 illustrates an embodiment of a cache flushing method based on a data placement scheme in accordance with example embodiments of the disclosure.

FIG. 6 illustrates an embodiment of a cache flushing method based on a data placement scheme in accordance with example embodiments of the disclosure. The method illustrated in FIG. 6 may be implemented, for example, using the cache operation logic 428, cache manager 430, cache configuration information 420, and/or the like, illustrated in FIG. 4 in which similar elements may be indicated by reference numbers ending in, and/or containing, the same digits, letters, and/or the like.

Referring to FIG. 6, the method may begin at operation 648, at which a cache flushing request for a target data placement unit may be received (e.g., in the form of a command received from a user by the cache operation logic 428). The cache flushing request may include one or more LBAs, an LBA range, one or more RUHs, and/or other information from which the target data placement unit (e.g., a reclaim group) for which the cache flushing method may be performed may be determined.

At operation 650, the method may determine, based on the target data placement unit (e.g., RG0), and/or using cache configuration information 620, an address range (e.g., a page address range) for a target cache (e.g., Cache 0), which may also be referred to as a cache region, corresponding to the target data placement unit (e.g., RG0). At operation 652, the method may flush (e.g., copy) some or all of the data in the target cache region to the corresponding target data placement unit. in some embodiments, at operation 652, the method may also invalidate (e.g., mark as invalid) some or all of the data in the target cache region. In some embodiments, invalidating data in the target cache region may free (e.g., deallocate) memory and/or storage media used to implement the cache media for use by other users. Depending on the implementation details, this may improve cache utilization and/or other performance parameters.

The method illustrated in FIG. 6 may be used, for example, by a user that may be aware that data it may store in a data placement unit (e.g., a reclaim group) may have little or no locality, and thus, using the associated cache region may provide little, if any, benefit. Thus, in some embodiments, the method illustrated in FIG. 6 may provide relatively fast cache space release.

In some embodiments, the method illustrated in FIG. 6 may be used as part of a cache bypass method. For example, if an application (or other user) determines that data it will access has little or no locality, the application may request a temporary or permanent bypass configuration (e.g., by sending a bypass command to the cache operation logic 428) in which one or more accesses of a reclaim group may bypass a corresponding cache region and directly access the reclaim group in storage media (e.g., without checking for a cache hit). In such a bypass configuration, the cache operation logic 428 may use the method illustrated in FIG. 6 to flush some or all of the data in the target cache region to the corresponding target data placement unit and/or invalidate some or all of the data in the target cache region. Depending on the implementation details, this may free memory and/or storage media used to implement the cache media for use by other users, at least while the bypass configuration is being used.

Figure 7:
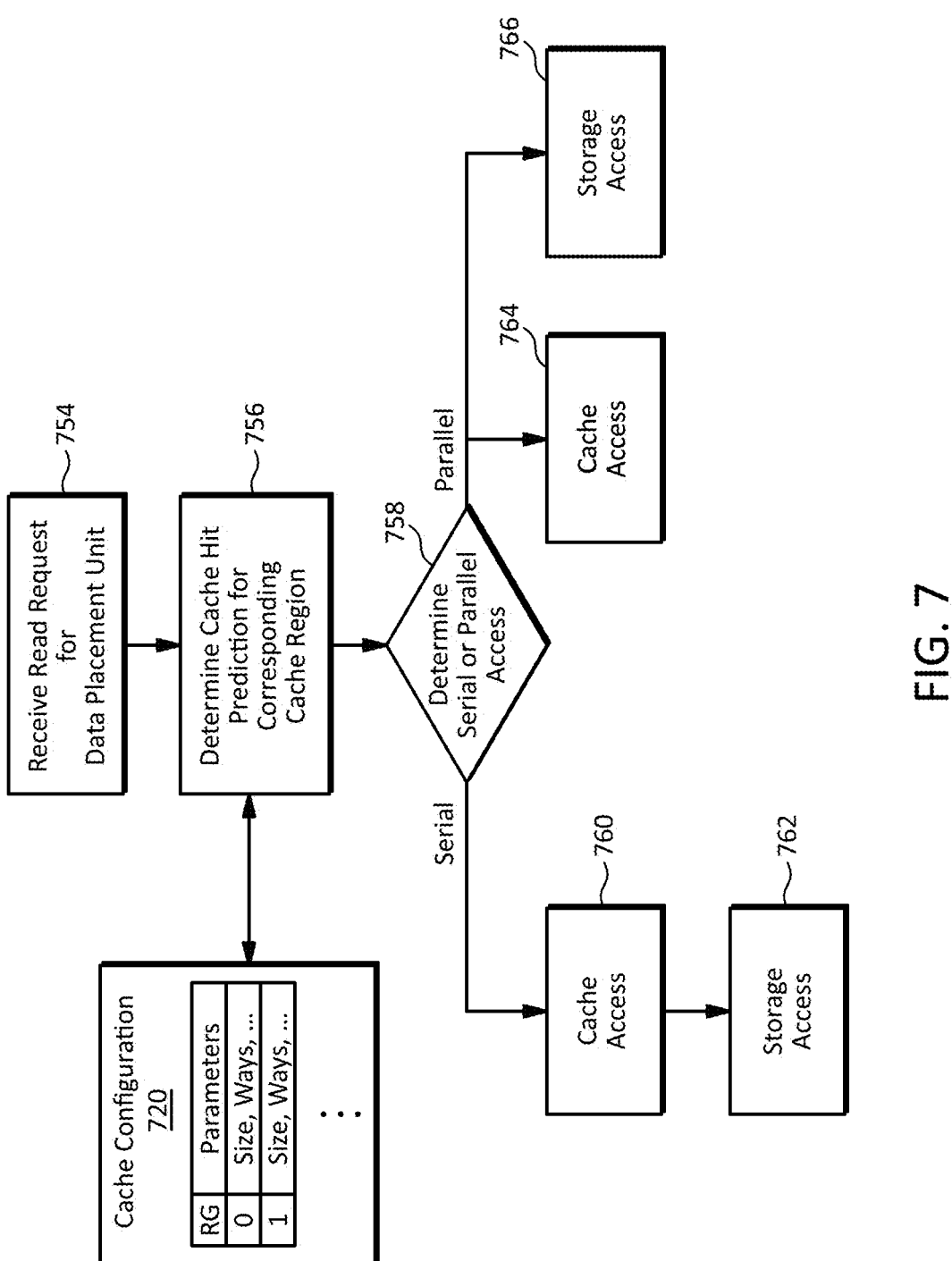
FIG. 7 illustrates an example embodiment of a cache access method based on a data placement scheme in accordance with example embodiments of the disclosure.

FIG. 7 illustrates an example embodiment of a cache access method based on a data placement scheme in accordance with example embodiments of the disclosure. The method illustrated in FIG. 7 may be implemented, for example, using the cache operation logic 428, cache manager 430, cache configuration information 420, and/or the like, illustrated in FIG. 4 in which similar elements may be indicated by reference numbers ending in, and/or containing, the same digits, letters, and/or the like.

Referring to FIG. 7, the method may begin at operation 754, at which a read request is received (e.g., from a user by the FDP manager 422 illustrated in FIG. 4) for a target data placement unit having a corresponding target cache region. At operation 756, the method may determine, based on the target data placement unit and/or using cache configuration information 720, cache hit information such as a likely cache hit rate (e.g., an estimated and/or predicted hit rate) for the target cache region corresponding to the target data placement unit. The cache hit information may be determined, for example, by the cache predictor 432 illustrated in FIG. 4.

At operation 758, the method may determine an access technique to use for the read request. For example, if the cache hit information includes a relatively high likely cache hit rate, the method may proceed to operation 760 at which the corresponding target cache region may be checked for a cache hit. In the event of a cache hit, the requested read data may be retrieved from the corresponding target cache region and returned in response to the read request. If, however, a cache miss is encountered, the method may proceed to operation 762 at which the requested read data may be retrieved from the corresponding target data placement unit in storage media (e.g., by the FDP manager 422 illustrated in FIG. 4) and returned in response to the read request.

If, however, at operation 758, the cache hit information includes a relatively low likely cache hit rate, the method may proceed to operation 764 at which the corresponding target cache region may be checked for a cache hit (e.g., by the cache manager 430 illustrated in FIG. 4), and to operation 766 at which the requested read data may be retrieved from the corresponding target data placement unit in storage media (e.g., by the FDP manager 422 illustrated in FIG. 4). In some embodiments, the target cache region may be checked for a cache hit and the target data placement unit may be accessed in parallel. (E.g., operations 764 and 766 may overlap.) This may reduce a latency associated with retrieving the requested read data from the target data placement unit, for example, by reducing or eliminating a delay associated with waiting for the results of checking the target cache region for a hit. In the relatively unlikely event of a cache hit, the requested read data may be retrieved from the target cache region. The requested read data may be obtained from whichever source provides the data first (e.g., the target cache region or the target data placement unit) and returned in response to the read request. Depending on the implementation details, this may reduce access latency, increase cache media and/or storage media bandwidth and/or efficiency, and/or the like.

The method illustrated in FIG. 7 may be applied to read requests received in any manner, for example, a request to access a data placement unit as storage using the first (e.g., NVMe) command manager 434 illustrated in FIG. 4, and/or a request to access a data placement unit as memory using the second (e.g., CXL) command manager 436 (e.g., using a CXL.mem data path).

Figure 8:
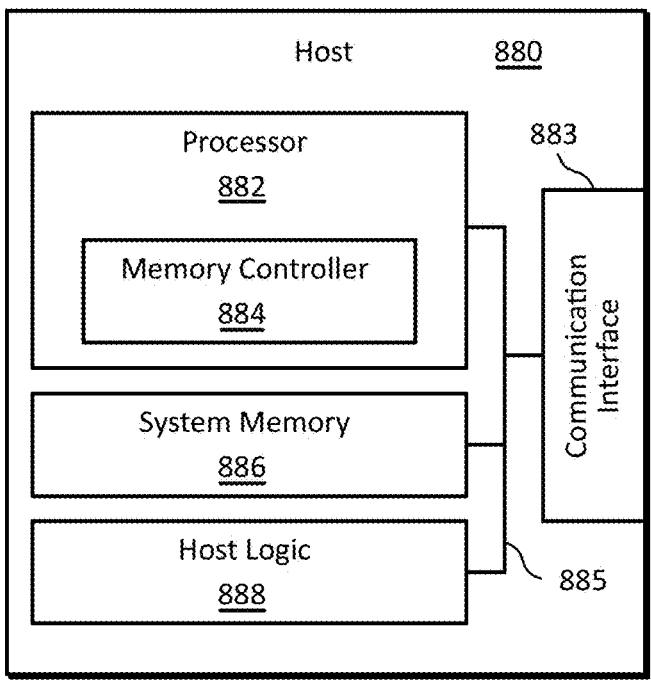
FIG. 8 illustrates an example embodiment of a host apparatus in accordance with example embodiments of the disclosure.

FIG. 8 illustrates an example embodiment of a host apparatus that may be used to implement any of the host and/or other user functionality disclosed herein in accordance with example embodiments of the disclosure. The host apparatus 880 illustrated in FIG. 8 may include a processor 882, which may include a memory controller 884, a system memory 886, node control logic 888, and/or a communication interface 883. Any or all of the components illustrated in FIG. 8 may communicate through one or more system buses 885. In some embodiments, one or more of the components illustrated in FIG. 8 may be implemented using other components. For example, in some embodiments, the host logic 888 may be implemented by the processor 882 executing instructions stored in the system memory 886 or other memory.

The host logic 888 may be used to implement any of the host and/or other user functionality disclosed herein, for example, one or more of the host 401, applications 438, user-side FDP configuration logic 440, and/or user-side cache configuration logic 442 and/or the like, described above with respect to FIG. 4.

Figure 9:
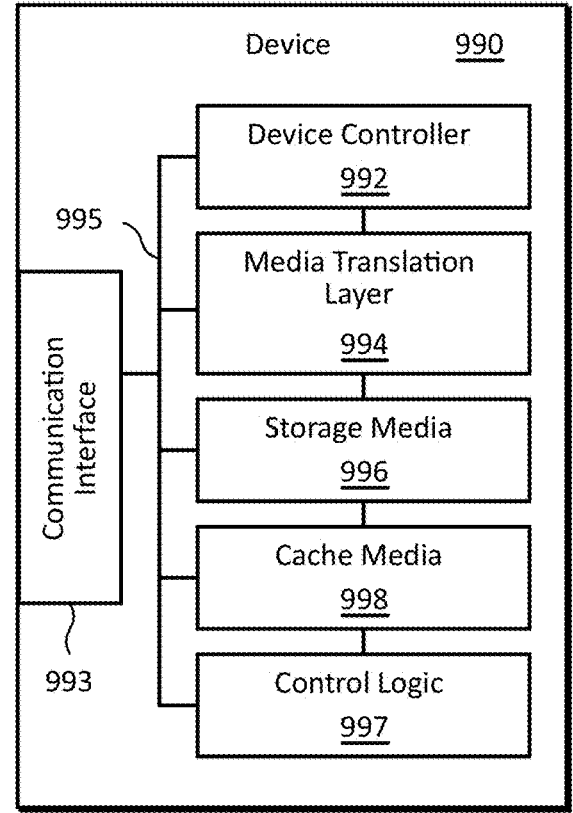
FIG. 9 illustrates an example embodiment of a device in accordance with example embodiments of the disclosure.

FIG. 9 illustrates an example embodiment of a device that may be used to implement any of the device functionality disclosed herein in accordance with example embodiments of the disclosure. The device 990 may include a device controller 992, a media translation layer 994 (e.g., an FTL), storage media 996, cache media 998, control logic 997, and a communication interface 993. The components illustrated in FIG. 9 may communicate through one or more device buses 995. In some embodiments that may use flash memory for some or all of the storage media 996, the media translation layer 994 may be implemented partially or entirely as a flash translation layer (FTL).

The control logic 997 may be used to implement any of the device functionality disclosed herein, for example, any or all of the FDP configuration information 418, cache configuration information 420, FDP manager 422, FTL 424, NAND interface layer 426, cache operation logic 428, cache manager 430, cache predictor 432, first command manager 434, and/or second command manager 436 described above with respect to FIG. 4.

Figure 10:
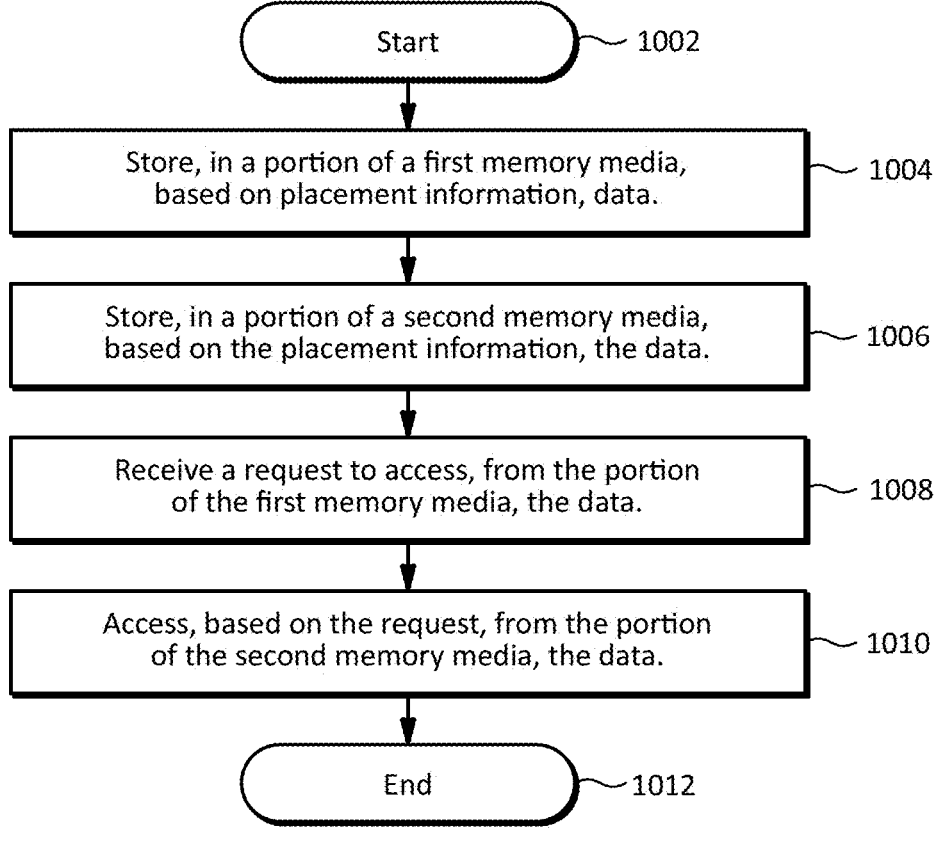
FIG. 10 illustrates an embodiment of a method for operating a cache with a data placement scheme in accordance with example embodiments of the disclosure.

FIG. 10 illustrates an embodiment of a method for operating a cache with a data placement scheme in accordance with example embodiments of the disclosure. The method may begin at operation 1002. At operation 1004, the method may store, in a portion of a first memory media, based on placement information, data. For example, referring to FIG. 2, control logic 208 may store data 211 in a data placement unit 212 in storage media 204 based on placement information 218.

Referring to FIG. 10, at operation 1006, the method may store, in a portion of a second memory media, based on the placement information, the data. For example, referring to FIG. 2, the control logic 208 may store the data 211 in a cache region 214 in cache media 206 based on the placement information 218.

Referring to FIG. 10, at operation 1008, the method may receive a request to access, from the portion of the first memory media, the data. For example, referring to FIG. 2, the control logic 208 may receive a request 209 to access the data 211 from the data placement unit 212 in the storage media 204.

Referring to FIG. 10, at operation 1010, the method may access, based on the request, from the portion of the second memory media, the data. For example, referring to FIG. 2, the control logic 208 may access the data 211 from the cache region 214 in the cache media 206. The method may end at operation 1012.

The embodiment illustrated in FIG. 10, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Any of the functionality described herein, including any of the functionality that may be implemented with a host, a device (e.g., a storage device), and/or the like, or a combination thereof, including, for example, any of the storage and/or cache access logic 316, FDP configuration information 418, cache configuration information 420, FDP manager 422, FTL 424, NAND interface layer 426, cache operation logic 428, cache manager 430, cache predictor 432, first command manager 434, and/or second command manager 436, user-side FDP configuration logic 440, and/or user-side cache configuration logic 442 and/or the like described above with respect to FIG. 3 and/or FIG. 4 may be implemented with hardware (e.g., circuitry), software, firmware, or any combination thereof including, for example, hardware and/or software combinational logic, sequential logic, timers, counters, registers, state machines, volatile memories such DRAM and/or SRAM, nonvolatile memory including flash memory, persistent memory such as cross-gridded nonvolatile memory, memory with bulk resistance change, PCM, and/or the like, one or more complex programmable logic devices (CPLDs), field programmable gate arrays (FPGAs), application specific integrated circuits (ASICs), processors including one or more complex instruction set computer (CISC) processors such as x86 processors and/or reduced instruction set computer (RISC) processors such as ARM processors, graphics processing units (GPUs), neural processing units (NPUs), tensor processing units (TPUs), data processing units (DPUs) and/or the like, executing instructions stored in any type of memory, or any combination thereof. In some embodiments, one or more components may be implemented as a system-on-chip (SOC).

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on"

may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A device comprising:
a first memory media;
a second memory media; and
at least one control circuit configured to:
    receive placement information for data, the placement information comprising a reclaim unit handle for a reclaim unit included in a reclaim group of the first memory media;
    store, in a data placement unit implemented with the reclaim group of the first memory media, based on the placement information, the data;
    store, in a portion of the second memory media that is associated with the data placement unit, based on the placement information, the data;
    receive a request to access the data stored in the data placement unit of the first memory media; and
    access the data from the portion of the second memory media based on the request.

2. The device of claim 1, wherein the at least one control circuit is configured to modify, based on an allocation status, a portion of the first memory media to an available state.

3. The device of claim 1, wherein the data placement unit of the first memory media is a first portion of the first memory media, the portion of the second memory media is a first portion of the second memory media, the placement information is first placement information, the data is first data, and the at least one control circuit is configured to:
    receive second placement information for second data;
    store, in a second portion of the first memory media, based on the second placement information, the second data; and
    store, in a second portion of the second memory media, based on the second placement information, the second data.

4. The device of claim 3, wherein the at least one control circuit is configured to:
    receive configuration information;
    configure the first portion of the first memory media based on the configuration information; and
    configure the first portion of the second memory media based on the configuration information.

5. The device of claim 3, wherein the at least one control circuit is configured to:
    receive first configuration information; and
    configure the first portion of the second memory media based on the first configuration information.

6. The device of claim 5, wherein the at least one control circuit is configured to:
    receive second configuration information; and configure the second portion of the second memory media based on the second configuration information.

7. The device of claim 1, wherein the at least one control circuit is configured to:
    receive a request to perform an operation associated with a portion of the first memory media; and
    perform, based on the request to perform the operation, the operation using the portion of the second memory media.

8. The device of claim 7, wherein the operation comprises copying, from the portion of the second memory media to the portion of the first memory media, at least a portion of the data.

9. The device of claim 7, wherein the operation comprises modifying a status of at least a portion of the portion of the second memory media.

10. The device of claim 1, wherein the at least one control circuit is configured to perform, based on a result of a first operation to access the portion of the second memory media, an access operation comprising:
    performing a second operation to access the data placement unit of the first memory media; and
    performing a third operation to access the portion of the second memory media.

11. The device of claim 10, wherein the result of the first operation to access the portion of the second memory media comprises reading, from the portion of the second memory media, at least a portion of the data.

12. The device of claim 10, wherein the at least one control circuit is further configured to perform the access operation based on a result of a fourth operation to access the portion of the second memory media.

13. The device of claim 12, wherein:
    the result of the first operation to access the portion of the second memory media comprises reading, from the portion of the second memory media, at least a portion of the data; and
    the result of the fourth operation to access the portion of the second memory media comprises reading, from the data placement unit of the first memory media, at least a portion of the data.

14. The device of claim 1, wherein the placement information includes at least one data placement directive and a reclaim group identifier of the reclaim group.

15. A device comprising:
a first memory media;
a second memory media; and
at least one control circuit configured to:
    receive first configuration information to configure, based on placement information for data, a data placement unit implemented with a reclaim group of the first memory media;
    replace a default configuration of the first memory media by associating the data placement unit with a portion of the second memory media;
    receive second configuration information to configure, based on the placement information for the data, the portion of the second memory media;
    receive a request to access, from the data placement unit of the first memory media, the data;
    access, based on the request, from the portion of the second memory media, the data; and
    modify a status of at least a portion of the portion of the second memory media.

16. The device of claim 15, wherein the placement information for the data is first placement information for first data, the data placement unit of the first memory media is a first portion of the first memory media, the portion of the second memory media is a first portion of the second memory media, and the at least one control circuit is configured to:

receive third configuration information to configure, based on second placement information for second data, a second portion of the first memory media; and receive fourth configuration information to configure, based on the second placement information for the second data, a second portion of the second memory media.

17. The device of claim 15, wherein the at least one control circuit is configured to modify, based on an allocation status, a portion of the first memory media to an available state.

18. A method comprising:

storing, in a data placement unit implemented with a reclaim group of a first memory media, based on placement information, data;

replacing a default configuration of the first memory media by associating the data placement unit with a portion of a second memory media;

storing, in the portion of a second memory media, based on the placement information, the data;

receiving a request to access, from the data placement unit of the first memory media, the data;

accessing, based on the request, from the portion of the second memory media, the data; and modifying a status of at least a portion of the portion of the second memory media.

19. The method of claim 18, wherein the data placement unit of the first memory media is a first portion of the first memory media, the portion of the second memory media is a first portion of the second memory media, the placement information is first placement information, the data is first data, the request is a first request, and the method further comprises:

storing, in a second portion of the first memory media, based on second placement information, second data;

storing, in a second portion of the second memory media, based on the second placement information, the second data;

receiving a second request to access, from the second portion of the first memory media, the second data; and accessing, based on the second request, from the second portion of the second memory media, the second data.

20. The method of claim 19, wherein:

the first portion of the second memory media is operated based on first configuration information; and the second portion of the second memory media is operated based on second configuration information.

* * * * *